(12) United States Patent
Pope et al.

(10) Patent No.: US 7,572,881 B2
(45) Date of Patent: Aug. 11, 2009

(54) METHOD FOR FORMING HAFNIUM CARBIDE AND HAFNIUM NITRIDE CERAMICS AND PRECERAMIC POLYMERS

(76) Inventors: Edward J. A. Pope, 447 Lorenzo Dr., Oak Park, CA (US) 91377; Jozsef Hepp, 1578 Glenbrock La., Thousand Oaks, CA (US) 91320; Kenneth M. Kratsch, 43529 Inverness St., Palm Desert, CA (US) 92253

( * ) Notice: Subject to any disclaimer, the term of this patent is extended or adjusted under 35 U.S.C. 154(b) by 0 days.

(21) Appl. No.: 11/698,222

(22) Filed: Jan. 25, 2007

(65) Prior Publication Data

US 2007/0178038 A1   Aug. 2, 2007

Related U.S. Application Data

(63) Continuation of application No. 10/058,808, filed on Jan. 28, 2002, now abandoned, which is a continuation-in-part of application No. 09/325,524, filed on Jun. 3, 1999, now Pat. No. 6,403,750.

(51) Int. Cl.
   *C08G 79/00*   (2006.01)
   *C07F 7/00*    (2006.01)
   *C07F 7/28*    (2006.01)

(52) U.S. Cl. ........................ 528/395; 556/61
(58) Field of Classification Search .............. 556/51; 528/395

See application file for complete search history.

(56) References Cited

U.S. PATENT DOCUMENTS

| | | | | |
|---|---|---|---|---|
| 2,269,498 A * | 1/1942 | Wainer | ............... | 556/51 |
| 3,630,766 A * | 12/1971 | Economy et al. | ............... | 501/95.1 |
| 3,671,292 A * | 6/1972 | Hirshfeld et al. | ............... | 422/93 |
| 3,787,368 A * | 1/1974 | Lander | ............... | 528/234 |
| 5,399,378 A | 3/1995 | Uemura et al. | | |
| 5,443,771 A * | 8/1995 | Gupta | ............... | 264/82 |
| 5,883,278 A * | 3/1999 | Strickler et al. | ............... | 556/53 |
| 5,900,498 A * | 5/1999 | Winter et al. | ............... | 556/51 |
| 6,277,440 B1 * | 8/2001 | Reynolds | ............... | 427/226 |
| 6,355,338 B1 | 3/2002 | Hilmas et al. | | |
| 6,403,750 B1 | 6/2002 | Pope et al. | | |
| 6,831,188 B1 * | 12/2004 | Beard et al. | ............... | 556/51 |
| 7,030,450 B2 * | 4/2006 | Lee et al. | ............... | 257/411 |
| 7,238,821 B2 * | 7/2007 | Meiere et al. | ............... | 556/51 |

FOREIGN PATENT DOCUMENTS

EP   1 394 164   * 3/2004

* cited by examiner

*Primary Examiner*—Liam J Heincer
(74) *Attorney, Agent, or Firm*—Connolly Bove Lodge & Hutz LLP; Jonathan A. Jaech

(57) ABSTRACT

Hafnium containing preceramic polymer is made through the reaction of hafnium halide compound with any of the following compounds: ethylene diamine, dimethyl ethylene diamine, piperazine, allylamine and or polyethylene-imine.

24 Claims, 8 Drawing Sheets

METHOD FOR FORMING HAFNIUM CARBIDE AND HAFNIUM NITRIDE CERAMICS AND PRECERAMIC POLYMERS

CROSS REFERENCE TO RELATED APPLICATIONS

This application is a continuation of application Ser. No. 10/058,808, filed Jan. 28, 2002, now abandoned, which is a continuation-in-part of an application filed Jun. 3, 1999 under Ser. No. 09/325,524, now Pat. No. 6,403,750, which applications are incorporated herein, in their entirety, by reference.

BACKGROUND OF THE INVENTION

The field of the invention is specific applications of photo curable pre-ceramic polymer chemistry to specific applications.

Commercially available high temperature ceramic matrix composites are limited to carbon fiber/carbon matrix, carbon fiber/SiC matrix, SiC fiber/SiC matrix, and more recently, carbon or SiC fiber in a silicon nitride/carbide matrix. The upper use temperature is limited to below 1600 degrees centigrade at best for all but carbon/carbon, which is highly susceptible to oxidation above 400 degrees centigrade. Carbon/carbon can be utilized at ultra high temperatures (above 2000 degrees centigrade) but only in a non-oxidizing environment. The limitations of carbon/carbon, the only truly ultra high temperature CMC system currently available, and the need for new ceramic materials was summarized by Opeka quite recently: "Ultrahigh temperature applications such as combustion chamber liners, rocket thrusters, thermal protection systems for carbon-carbon composites, and leading edges of the spacecraft require materials, which are protective and oxidation resistant at temperatures higher than 2000 degrees centigrade. Refractory ceramics such as hafnium diboride (HfB2), hafnium carbide (HfC) and hafnium nitride (HfN) are candidate materials because of their high melting points, low coefficient of thermal expansion, high erosion and oxidation resistance." Arvind Agarwal, Tim McKeechnie, Stuart Starett and Mark M. Opeka, Proceedings for the symposium of Elevated Temperature Coatings IV. 2001 TMS Annual Meeting New Orleans, La., pp. 301-315.

U.S. Pat. No. 5,332,701 teaches ceramic compositions that can be formed by the pyrolysis of a particulate metal. The particulate metal forms a component of the ceramic and another metal that forms another component of the ceramic.

The rational for producing a nanocomposite, rather than phase pure HfC or HfN, is that the presence of both carbon and nitrogen hinder the formation of long-range order and allow the HfCN nanocomposite to be processed at high temperature in an amorphous "glassy" state prior to crystallization. This retention of the "glassy" state to high temperatures (>1400 degrees centigrade) in the silicon nitride/carbide (SiNC) system has been seen. In the case of HfCN, the temperature of crystallization should be even higher due to the fact that hafnium is tetravalent in HfC and trivalent in HfN. In addition, the melting points of HfC and HfN are significantly higher than that of silicon carbide and silicon nitride.

Numerous pre-ceramic polymers with improved yields of the ceramic have been described in U.S. Pat. No. 5,138,080, U.S. Pat. No. 5,091,271, U.S. Pat. No. 5,051,215 and U.S. Pat. No. 5,707,471. The fundamental chemistry contained in these embodiments is specific to the process employed and mainly leaves the pre-ceramic polymer in a thermoplastic state. These pre-ceramic polymers which catalytic or photo-induced cross-linking do not satisfy the high ceramic yield, purity and fluidity in combination with low temperature cross-linking ability necessary for producing large densified ceramic structures in a single step continuous process.

U.S. Pat. No. 5,138,080 teaches a novel polysila-methylenosilane polymers which has polysilane-poly-carbosilane skeleton which can be prepared in one-step reaction from mixtures of chlorosilaalkanes and organochloro silanes with alkali metals in one of appropriate solvents or in combination of solvents thereof. Such polysilamethyleno silane polymers are soluble and thermoplastic Later versions of this polymer Me(H)SiCl$_2$ in addition to the Me$_2$SiCl$_2$ and are subjected to a sodium-hydrocarbon dechlorination process which does not attack vinyl groups. The resulting polymer consists of a predominately linear, Si—Si "backbone" bearing pendant methyl groups, with some Si—H and Si—CH=CH$_2$ functionality to allow crosslinking on pyrolysis.

None of these precursors derived using vinylchlorosilanes are similar to those of the process in that having predominantly Si—Si bonded "backbones", they are essentially polysilanes, not polycarbosilanes. In addition, the carbon in these polymers is primarily in the form of pendant methyl functionality and is present in considerable excess of the desirable 1 to 1 ratio with silicon. The ceramic products obtained from these polymers are known to contain considerable amounts of excess carbon.

Polymeric precursors to SiC have been obtained by redistribution reactions of methyl-chloro-disilane (Me$_{6-x}$Cl$_x$Si$_2$, x=24) mixtures, catalyzed by tetraalkyl-phosphonium halides which U.S. Pat. No. 4,310,481, U.S. Pat. No. 4,310,482 and U.S. Pat. No. 4,472,591 teach. In a typical preparation, elemental analysis of the polymer was employed to suggest the approximate formula [Si(Me)$_{1.15}$(H)$_{0.25}$]$_n$, with n averaging about 20. The structures of the polymers involve what is reported to be a complex arrangement of fused polysilane rings with methyl substitution and a polysilane backbone.

The formation of carbosilane polymers with pendent methyl groups has been prepared as by-products of the "reverse-Grignard" reaction of chloromethyl-dichloro-methylsilane. The chief purpose of this work was the preparation of carbosilane rings and the polymeric byproduct was not characterized in detail nor was its use as a SiC precursor suggested. Studies of this material indicate that it has an unacceptably low ceramic yield on pyrolysis. These polymers contain twice the required amount carbon necessary for stoichiometric silicon carbide and their use as SiC precursors was not suggested. Moreover, the starting material, chloromethyl-dichloro-methylsilane, contains only two sites on the Si and can be pyrolyzed to obtain improved yields of silicon carbide at atmospheric pressure.

U.S. Pat. No. 5,051,215 teaches a rapid method of infusibilizing pre-ceramic polymers that includes treatment of the polymers with gaseous nitrogen dioxide. The infusibilized polymers may be pyrolyzed to temperatures in excess of about 800.degree. C. to yield ceramic materials with low oxygen content and, thus, good thermal stability. The methods are especially useful for the production of ceramic fibers and, more specifically, to the on-line production of ceramic fibers.

U.S. Pat. No. 4,847,027 teaches a method for the preparation of ceramic materials or articles by the pyrolysis of pre-ceramic polymers wherein the pre-ceramic polymers are rendered infusible prior to pyrolysis by exposure to gaseous nitric oxide. Ceramic materials with low oxygen content, excellent physical properties, and good thermal stability can be obtained by the practice of this process. This method is especially suited for the preparation of ceramic fibers.

U.S. Pat. No. 4,631,179 teaches a ring-opening-polymerization reactions method to obtain a linear polymer of the formula $[SiH_2CH_2]_n$. This polymer exhibit ceramics yields up to 85% on pyrolysis. The starting material for the ring-opening-polymerization reaction was the cyclic compound $[Si-H_2CH_2]_2$, which is difficult and costly to obtain in pure form by either of the procedures that have been reported.

U.S. Pat. No. 5,153,295 teaches compositions of matter that have potential utility as precursors to silicon carbide. These compositions are obtained by a Grignard coupling process. The process starts from chlorocarbosilanes and a readily available class of compounds. These polymers have the advantage that it is only necessary to lose hydrogen during pyrolysis, thus ceramic yields of over 90% are possible, in principle. The extensive Si—H functionality allows facile crosslinking and the 1 to 1 carbon to silicon ratio and avoids the incorporation of excess carbon in the SiC products that are ultimately formed. The synthetic procedure employed to make them allows facile modification of the polymer, such as by introduction of small amounts of pendant vinyl groups, prior to reduction. The resulting vinyl-substituted "SiH.sub.2 CH.sub.2" polymer has been found to have cross-linking properties and higher ceramic yield.

A pre-ceramic polymer has been prepared by a thermally induced methylene insertion reaction of polydimethylsilane. The resulting polymer is only approximately represented by the formula $[SiHMeCH_2]_n$, as significant amounts of unreacted $(SiMe_2)_n$ units, complex rearrangements, and branching are observed. In addition to the carbosilane "units", large amounts of Si—Si bonding remains in the "backbone" of the polymer. This polymer disadvantageously contains twice the stoichiometric amount of carbon for SiC formation. The excess carbon must be eliminated through pyrolytic processes that are by no means quantitative. Despite the shortcomings, this polymer has been employed to prepare "SiC" fiber. However, it must be treated with various crosslinking agents prior to pyrolysis which introduce contaminants. This results in a final ceramic product that contains significant amounts of excess carbon and silica which greatly degrade the high temperature performance of the fiber.

SiC precursors, predominately linear polycarbo-silanes, have been prepared via potassium dechlorination of chloro-chloromethyl-dimethylsilane. The resulting polymers have not been fully characterized, but probably contain significant numbers of Si—Si and $CH_2—CH_2$ groups in the polymer backbone. The alkali metal dechlorination process used in the synthesis of such materials does not exhibit the selective head-tail coupling found with Grignard coupling. The pendant methyl groups in such materials also lead to the incorporation of excess carbon into the system. In several polymer systems mixtures containing vinylchlorosilanes (such as $CH_2=CH—Si(Me)Cl2$) and $Me_2SiCl_2$ are coupled by dechlorination with potassium in tetrahydro-furan. U.S. Pat. No. 4,414,403 and U.S. Pat. No. 4,472,591 both teach this method. The "backbone" of the resulting polymers consists of a combination of Si—Si and Si—$CH_2CH(—Si)_2$ units. atom for chain growth and therefore cannot yield a structure which contains tbd.SiCH.sub.2-chain units. On this basis, the structure of the polymer obtained, as well as its physical properties and pyrolysis characteristics, is not optimal for use as an SiC precursor.

U.S. Pat. No. 4,631,179 teaches a polymer which is a product of the ring-opening polymerization of $(SiH_2CH_2)_2$ also has the nominal composition "$SiH_2CH_2$". However, the actual structure of this polymer is reported to be a linear polycarbosilane which presumably has only $[SiH_2CH_2]$ as the internal chain segments. The $(SiH_2CH_2)_2$ monomer used by Smith is difficult and expensive to prepare and not generally available.

SUMMARY OF THE INVENTION

The present invention is generally directed to a process of forming hafnium carbide that is derived from a preceramic polymer.

In a first separate aspect of the invention the hafnium nitride contains a ceramic fiber derived from a preceramic polymer.

In a second separate aspect of the invention the hafnium contains preceramic polymer derived from the reaction of a hafnium containing halide compound and an amine containing organic compound.

In a third separate aspect of the invention the preparation of a hafnium contains preceramic polymer through the reaction of hafnium halide compound with any of the following compounds: ethylene diamine, dimethyl ethylene diamine, piperazine, allylamine, or polyethylene-imine.

In a fourth separate aspect of the invention the production of a hafnium carbide containing ceramic fiber consists of the steps of melting a hafnium containing preceramic polymer, extruding said polymer through an orifice to form fiber, cross-linking said fiber and heating the cross-linked fiber under controlled atmospheric conditions at a temperature greater than 600 degrees centigrade to obtain a hafnium carbide containing ceramic fiber.

In a fifth separate aspect of the invention the production of a hafnium nitride containing ceramic fiber consists of the steps of melting a hafnium containing preceramic polymer, extruding said polymer through an orifice to form a fiber, cross-linking said fiber and heating the cross-linked fiber under in an ammonia containing atmosphere at a temperature greater than 600 degrees centigrade to obtain a hafnium nitride containing ceramic fiber.

Other aspects and many of the attendant advantages will be more readily appreciated by reference to the following detailed description.

DESCRIPTION OF THE PREFERRED EMBODIMENT

Figure 1:
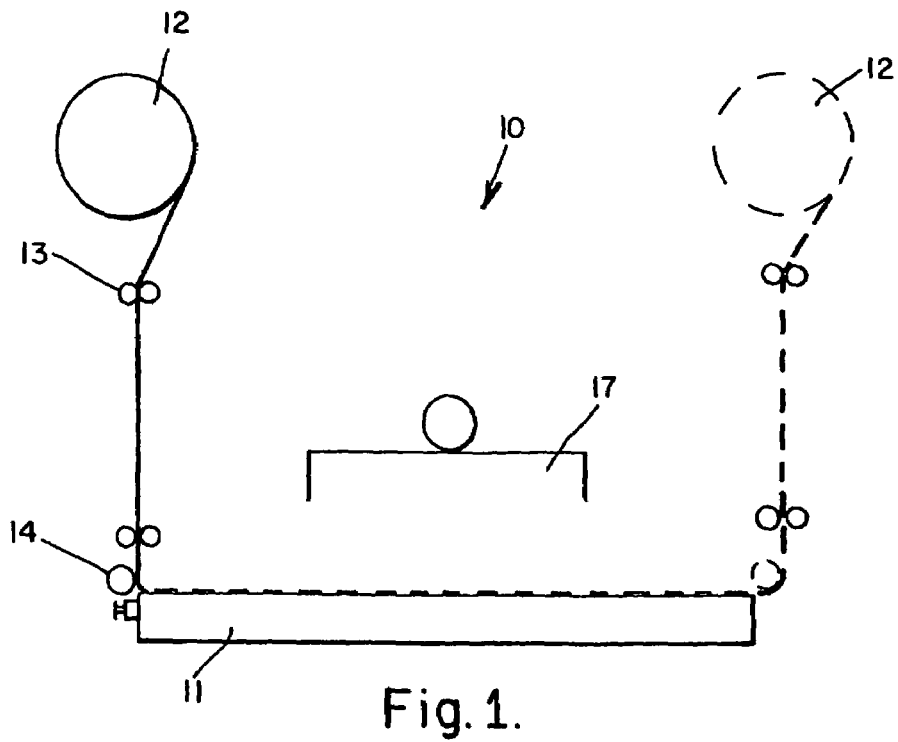
FIG. 1 is a schematic drawing of an apparatus for making flat plates of ceramic composites from photo-curable pre-ceramic polymers.

A continuous single step manufacturing process for fabricates dense low-porosity composites using novel cross-linkable pre-ceramic polymers and simple plastic industry technology adapted to the thermoset capability of the pre-ceramic polymer. The process eliminates the multi-cycle polymer impregnation pyrolysis method. The process is a simple controllable production process for fiber reinforced ceramic matrix composites, which can be easily automated into large manufacturing continuous processes. This process combines high-yield cross-linkable pre-ceramic polymers and a single step automated process mechanism to produce ceramic components on the scale of aircraft fuselages, boat hulls, and large single ceramic sheets for space vehicle skin panels. The process provides chemically modified pre-ceramic polymers which are very fluid at temperatures 60° C.-100° C., have high ceramic yields by weight of 75-95%, exhibit high purity and can be crosslinked into a thermoset with ultraviolet radiation.

The process synthesizes these polymers by a series of chemical substitutions using commercially available polymers to incorporate ethynyl side groups on the polymers. The resulting polymers contain unstable carbon triple bonds and are cross-linked by hydrosilylation with Si—H groups upon photo-exposure. The process uses chemical substitution ethynyl side group chemistry to produce SiC, Si3N4, AL2O3 and AL3N4 and TiC upon pyrolysis after photo-exposure. Conversion of precursor polymers like polycarbosilane and polysilazane to poly(ethynyl)carbosilane and poly(ethynyl)silazane achieve this objective.

In an embodiment of the invention, a fiber, tape, fabric, or woven cloth is drawn onto a mandrel or suitable substrate, first passing through the chemically modified pre-ceramic polymer. The objective of this process is to saturate the fiber, tape, fabric, woven cloth with the very fluid pre-ceramic polymer and then photo-cure it on the mandrel or substrate as the saturated material is drawn along by motorized winding or pulling mechanisms known to the prior art. The process provides a continuous fabrication process to enable making a dense (total porosity <8%) fiber reinforced ceramic composite in a single step. This objective is achieved by compacting each layer of pre-ceramic polymer saturated material onto the already pyrolyzed layer below permitting excess polymer to impregnate this layer. The back-fill allowed here reduces the final component porosity, increases strength and provides a short path for volatiles to escape, mitigating interlayer delamination. This layer by layer buildup is continued until the required component thickness is reached.

The novel nature of the photocurable pre-ceramic polymer enables a process, which is unique to porous filters not achievable with conventional pre-ceramic polymers. This process employs the ability to thermoset the pre-ceramic polymer into a rubbery hard solid prior to heating. In this form the pre-ceramic polymer can be heated and subsequently pyrolized without flowing into unwanted areas of the filter. Because of the ability of this process to produce high yield beta-SiC in near Si—C stoichiometry a matrix or coating is formed upon sintering that is highly receptive to heating with microwave energy. The microwave susceptible porous filter is ideally suited for trapping particulate from diesel engine exhausts and can be regenerativly used by microwave heating to a temperature above the oxidation threshold of the trapped particulate soot. The pre ceramic polymer can be made to form not only SiC but also other ceramic bodies such as $Si_3N_4$, BC, LAS, etc.

Referring to FIG. 1, an apparatus 10 for making flat plates of ceramic composites from photo-curable pre-ceramic polymers includes a frame 11 with a process bed, a set of fabric rollers 12, a set of guide rollers 13, a set of drive rollers 14, a drive motor 15, a compression roller 16, a process head 17 having a light-emitting lamp, a furnace 18, a covering 19 and a source of inert gas and a control panel 20. The source of inert gas provides an inert atmosphere.

Figure 2:
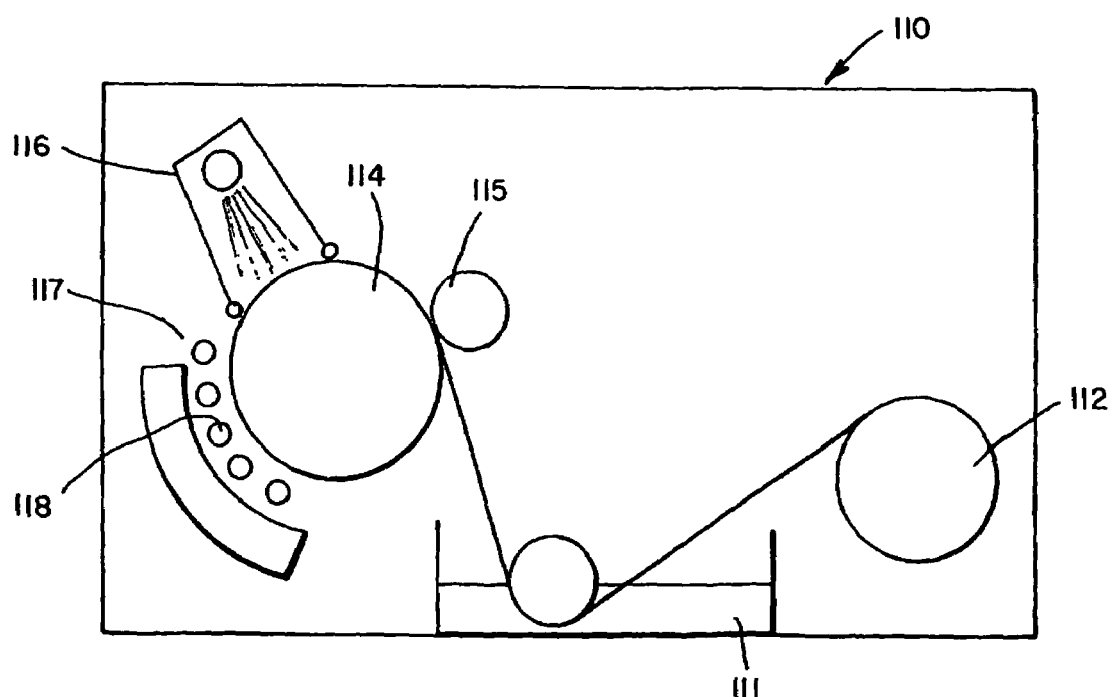
FIG. 2 is a schematic drawing of an apparatus for making cylinders of ceramic composites from photo-curable pre-ceramic polymers.

Referring to FIG. 2, an apparatus 110 for making cylinders of ceramic composites from photo-curable pre-ceramic polymers includes a dry nitrogen environmental chamber 111, a fabric roller 112, an applicator 113 of a photo-curable pre-ceramic polymer, a take-up mandrel 114, a pressure loaded compaction roller 115, a light-emitting lamp 116 and a consolidation and pyrolysis zone 117. The consolidation and pyrolysis zone 117 has a heater 118. The fabric roller dispenses woven ceramic fabric.

Commercially available polycarbosilanes and polycarbosiloxane polymers could be rendered photo-curable, by high intensity photo-radiation, through the addition of ethynyl side groups to the polymer. The polymer, poly(ethynyl) carbosilane, is rendered into an infusible thermoset upon photo-radiation. The process is able to similarly elevate ceramic yields to about. 85% by weight.

It has been demonstrated that various combinations of di-functional and tri-functional silane precursors can be utilized to enhance cross-linking and elevate ceramic yield. Combinations of dichlorodimethylsilane (di-functional) and trichlorophenylsilane (tri-functional) can be employed. Through the addition of branching, or cross-linking, ceramic yields as high as 77% have been obtained. Further, it is possible to dope these polymers, with boron for example, to control sintering and crystallization behavior.

While this process allows the addition of ethynyl side groups to potentially a wide range of available pre-ceramic polymers, there are other methods of directly synthesizing poly(ethynyl)carbosilane, which are outlined below. In both of the following reaction paths, tri-functional organotrichlorosilanes are utilized, in part or in entirety, to permit the introduction of photo-polymerizible side-groups, such as ethynyl groups derived from the reaction of sodium acetylide with chlorosilane.

In the first reaction route, sodium acetylide is reacted with the organotrichlorosilane, such as a methyl- or phenyltrichlorosilane, as shown in step 1. Typically, this is performed in a solvent, such as hexane or methylene chloride. The by-product of this reaction is sodium chloride, which is insoluble and can be easily removed by filtration and/or sedimentation (step 2). The resulting organo(ethynyl)chlorosilane can be reacted directly with sodium which is a Wurtz type condensation reaction or mixed with an organodichlorosilane prior to the initiation of polycondensation. Assuming that all "R"s are the same, and "a+b=1", then the following reaction path can be proposed:

TABLE 1

New processing route 1: Steps and reaction chemistries
to form poly (ethynyl) carbosilane-Final Product =
$1/n \{SiR_{(a+2b)}C\equiv CH_{ag}\}_n$.

| Processing Step | Reaction |
|---|---|
| 1. The addition of a ethynyl (acetylide) side groups to tri-functional polysilazane reactant. | a {$RSiCl_3$ + g $NaC\equiv CH \rightarrow RSiCl_{(3-g)}C\equiv CH_g$ + g NaCl} |
| 2. Remove NaCl by filtration. | −ag NaCl |
| 3. The addition of di-functional chain former (optional). | +b {$R_2SiCl_2$} |
| 4. Condensation of modified precursor solution to produce poly (ethynyl) silazane pre-ceramic polymer through the addition of sodium. | a $(RSiCl_{(3-g)}C\equiv CH_g)$ + b $(R_2SiCl_2)$ + 2[a(3 − g) + b]Na → $1/n\{Si_{(a+b)}R_{(a+2b)}C\equiv CH_{ag}\}_n$ + 2[a(3 − g) + b]NaCl |

In route 1, the photo-cross-linkable ethynyl group (acetylide) is added prior to the initiation of Würtz type condensation reaction. In route 2, ethynyl side-groups are added post-condensation, thereby avoiding the exposure of the ethynyl ligand to sodium during pre-ceramic polymer synthesis. In this process, tri-functional chlorosilanes, or a mixture of di-functional and tri-functional chlorosilanes, are reacted with a sub-stoichiometric quantity of metallic sodium, sufficient to bring about an increase in molecular weight and viscosity of the now pre-ceramic polymer backbone, but leaving a fraction of the chlorosilane reaction sites unreacted. The resulting sodium chloride by-product can be removed by filtration and/or sedimentation (step 2).

Following polymer condensation, with unreacted chlorosilane sites intact, excess sodium acetylide is added to react with the aforementioned unreacted sites to produce poly (ethynyl)carbosilane photo-curable pre-ceramic polymer. The poly(ethynyl)carbosilane pre-ceramic polymer can be retrieved by solvent evaporation by the application of heat and/or in vacuo. Assuming that all "R"s are the same, and "a+b=1", the final desired reaction product is expressed in the reaction path below in Table 2.

TABLE 2

New processing route 2: Steps, and reaction chemistries,
to form poly (ethynyl) carbosilane.

| Processing Step | Reaction |
|---|---|
| 1. Mixture of difunctional and trifunctional chlorosilanes reacted with a sub-stoichiometric amount of sodium (where y < [3a + 2b]). | a($RsiCl_3$) + b($R_2SiCl_2$) + [y]Na→ $(1/n)\{Si_{(a+b)}R_{(a+2b)}Cl_{[(3a+2b)-y]}\}n$ + [y] NaCl |
| 2. Remove NaCl by filtration and/or sedimentation. | −[y] NaCl |
| 3. Addition of ethynyl side groups to partially condensed polysilazane polymer through the addition of excess sodium acetylide. | $(1/n)\{Si_{(a+b)}R_{(a+2b)}Cl_{[(3a+2b)-y]}\}n$ + [(3a + 2b) − y]NaC≡XH □ $(1/v)\{\Sigma_{1(a+b)}R_{(a+2b)}C\equiv XH_{[(3a+2b)-y]}\}_n$ + [(3a + 2b) − y]NaCl |

Product = $(1/n) \{SiR_{(a+2b)}C\equiv CH_{[(3a+2b)-y]}\}_n$.

In the previous section, the method of preparing poly(ethynyl)carbosilane, a photo-curable pre-ceramic polymer precursor to silicon carbide has been reviewed. In this section, several of the promising methods of synthesizing polysilazane precursors to silicon nitride ($Si_3N_4$) and a method of conversion to poly(ethynyl)silazane, a photo-curable pre-ceramic polymer precursor to high yield $Si_3N_4$/SiC ceramic matrix composites are described. $Si_3N_4$ doped with 10-15 weight percent SiC has significantly lower creep at high temperature than pure $Si_3N_4$. The creep rate at the minumum was lower by a factor of three than that of the unreinforced, monolithic matrix of equal grain size. Thus, other researchers have recognized the potential importance of $Si_3N_4$/SiC nanocomposite matrices for continuous ceramic fiber reinforced composites used in high temperature applications. Two advantages of the process of the process are the ability to fabricate large-scale composites employing existing polymer composite fabrication techniques due to the addition of the photo-cross-linkable ethynyl side-groups and the inclusion of the carbon containing ethynyl group should lead to the addition of approximately 5 to 20 weight percent SiC upon pyrolysis.

One of the simplest and direct methods of preparing polysilazane precursors to silicon nitride, with a 70 weight percent ceramic yield is to dissolve dichlorosilane in dichloromethane to yield polysilazane oils. Pyrolysis in flowing nitrogen gas yielded nearly phase pure a-$Si_3N_4$ after heat treatment at 1150° C. for 12 hours. Numerous other permutations and refinements to the preparation of polysilazane oils and polymers have been developed. The reaction path of polysilazane formation using dichlorosilanes and ammonia is set out below:

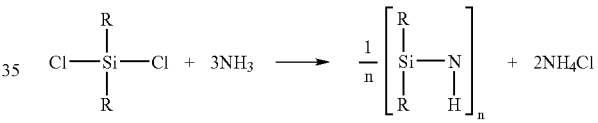

A number of the most direct permutations include the use of trichlorosilanes, methyltrichlorosilanes, dimethyldichlorosilanes, and vinyl-, butyl-, phenyl-, ethyl-, and hexyl-modified chlorosilanes. Increased molecular weight, and correspondingly increased ceramic yield, can be achieved by catalytically enhancing the cross-linking during final polymer preparation. A number of novel methods, including the use of ruthenium compounds and potassium hydride have been demonstrated to give ceramic yields upon pyrolysis as high as 85 percent. The inducement of cross-linking prior to pyrolysis is essential to achieving the high ceramic yields necessary to large-scale commercialization of $Si_3N_4$ matrix composites for high temperature applications. The cross-linking methods cited in the literature, however, are chemical catalysts, making the shaping and forming processes extremely difficult.

A ceramic matrix of predominantly silicon nitride with about 10-15% SiC by weight is nearly ideal for fabricating CMCs. In addition, the catalytic cross-linking of the polysilazane precursor dramatically increases ceramic yield. The synthesis route should produce high yield $Si_3N_4$/SiC nanocomposites employing a photocurable pre-ceramic polymer precursor.

One possible method would be to synthesize the unmodified polysilazane through the ammonolysis of various chlorosilane reactants in dichloromethane solvent followed by modifying the resulting polysilazanes, using a previously described process of chlorination followed by attachment of the ethynyl through reaction with sodium acetylide. Another alternative approach starts with a variety of dichlorosilanes and/or trichlorosilanes and reacts them with sodium acetylide at various concentrations, followed by ammonolysis to result in the final poly(ethynyl) silazane precursor as specifically detailed in the Table 3 below:

TABLE 3

Processing steps and reaction chemistries to form poly (ethynyl) silazane

| Processing Step | Reaction |
| --- | --- |
| 1. The addition of acetylide side groups to trifunctional polysilazane reactant. | a {$RSiCl_3$ + g NaCCH → $RSiCl_{(3-g)}CCH_g$ + g NaCl} |
| 2. Remove NaCl by filtration. | −ag NaCl |
| 3. The addition of di-functional chain former | +b {$R_2SiCl_2$} |
| 4. ammonolysis of modified precursor solution to produce poly(ethynyl)silazane pre-ceramic polymer | a ($RSiCl_{(3-g)}CCH_g$) + b ($R_2SiCl_2$) + $NH_3$ → b{[$SiR_2(NH)$]$_n$} + a{[$RSi(NH)_{(3-g)}CCH_g$]$_m$} + 2[a(3 − g) + 2b]$NH_4CL$ |

Parent application Ser. No. 09/325,524, now U.S. Pat. No. 6,403,750, includes numerous examples of combining commercially available polymers and catalysts to achieve a final photo-curable pre-ceramic polymer to SiC ceramics. In order to be photo-curable, the polymer requires either double-bonded carbons such as Allyl side groups or triple-bonded carbons such as acetylide or propargyl side groups. The catalysts can include a thermally curable component such as benzoil peroxide and a photo-curable initiator such as Ciba-Geigy's Irgacure 1800™ or a combination of camphorquinone and 2-(dimethylamino)-ethyl methacrylate).

Hafnium Carbide & Hafnium Nitride

Figure 5:
FIG. 5 is a photograph of a HfCN Nanocomposite Powder Derived from PPHZ Heat Treated to 1200 degrees centigrade under flowing Nitrogen.

To extend the family of photocurable preceramic polymers to HfCN nanocomposite ceramics, poly(propyl)hafnizane (PPHZ) and poly(ethynyl)hafnizane (PEHZ) preceramic polymers may be synthesized. Both low molecular weight and high molecular weight polymers have been demonstrated. Upon pyrolysis at 1200 degrees centigrade in flowing nitrogen, the ceramic yield has been measured at as high as 74% by weight. A photograph of the dark grey psuedo-amorphous HfCN nanocomposite powder produced from the pyrolysis of PPHZ at 1200 degrees centigrade is shown in FIG. 5. Through careful control of molecular weight, as has been demonstrated for our preceramic polymers to SiC and Si3N4, we believe we can tailor the viscosity for coating, fiber, and matrix infiltration applications.

Substantial effort has been assigned to develop effective methods for making advanced ceramic matrix composites using pre-ceramic polymers. This method is very successful so far for manufacturing silicon based composite materials like silicon carbide, silicon nitride, and silicon oxycarbide. Similar work has been done to produce organometallic precursors for the transition metal carbides, however with much more difficulties. Relatively few compounds of the hafnium metal are stable, do not contain oxygen and have a low carbon to metal ratio. Most compounds are easily sublimated, leading to a low ceramic yields upon pyrolysis.

Figure 3:
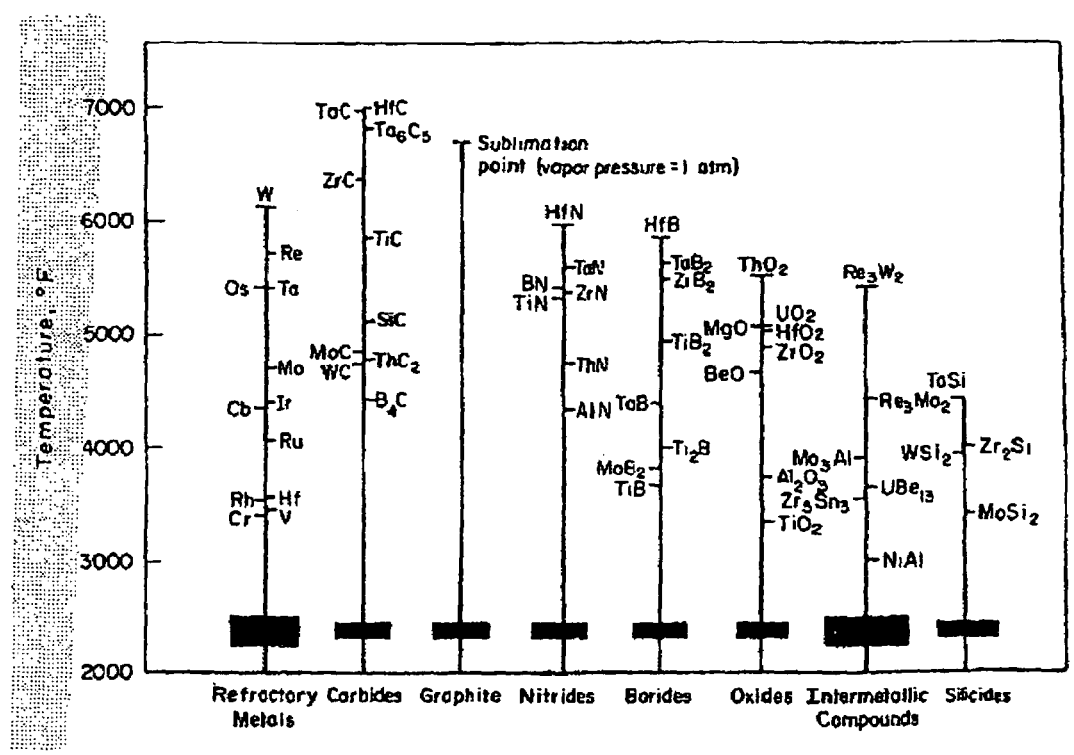
FIG. 3 is a graphical representation of melting points of high temperature refractory metals and ceramics that has been taken from Jaffee, R. and Maykuth, D. J., "Refractory Materials", Battelle Memorial Institute, Defense Metals Information Center, Memo 44, 1960.

Referring to FIG. 3 the desirable properties of HfC and HfN for ultra high temperature applications has been well recognized. Hafnium carbides high melting temperature has been known for decades. Hafnium carbide and nitride is conventionally prepared by hot-pressing to obtain monolithic HfC ceramics and CVD to obtain coatings. Currently, there are no examples of hafnium carbide fibers either commercially available or being developed for research. In the late 1980's, there was a brief program at Refractory Composites, Inc. (Whittier, Calif.) under the direction of Jim Warren to produce HfC fibers by chemical vapor deposition (CVD) onto carbon monofilaments, which was prohibitively expensive and unsuccessful. No HfC or HfN fibers have ever been prepared from preceramic polymers. Commercial applications for HfCN structural ceramic fibers and matrices include, but are not limited to, the following commercial and military solid rocket motor nozzle liner and nozzle components, liquid rocket combustors and nozzle extensions; liquid rocket tankage and lines, liquid rocket turbo-pump components, tactical missile canister systems and hypersonic leading edges.

Figure 4:
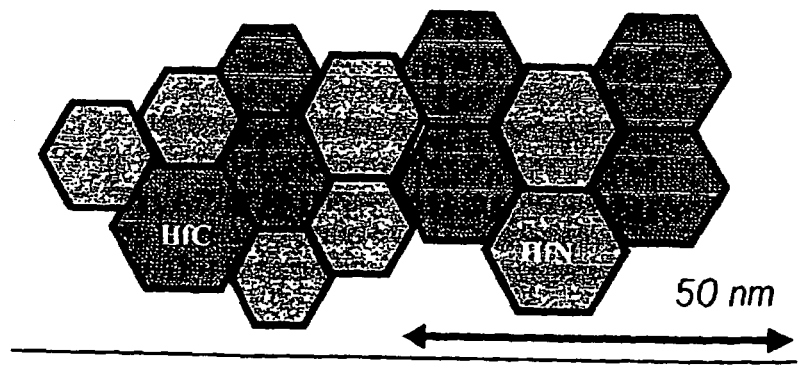
FIG. 4 is a schematic diagram of a molecular level Hf, C, & N mixing that could result in suppression of exaggerated grain growth at high temperatures. Also, better adherence of oxide layer.

Hafnium carbide is the most refractory binary composition known, with a melting point cited at from between 3890 to as high as 4160 degrees centigrade. Hafnium nitride is also the most refractory of all nitrides, with a melting point of 3307 degrees centigrade. For this reason, hafnium carbide and hafnium nitride have been proposed for very high temperature applications, such as zero erosion rocket nozzle throats and even as filaments in incandescent light bulbs. Hafnium carbide has a high thermal conductivity (292.88 W/moC) as does hafnium nitride (117.15 W/moC). Therefore, a mixed hafnium carbide/nitride nanocomposite should possess both a high melting point and high thermal conductivity. Selected properties of hafnium carbide, -nitride, and other materials are compared in FIG. 3. The melting points of a large selection of metals and ceramics are compared in FIG. 3 for convenience. FIG. 4 is a schematic diagram of a molecular level Hf. C, & N mixing that could result in suppression of exaggerated grain growth at high temperatures. Also, better adherence of oxide layer.

Figure 6:
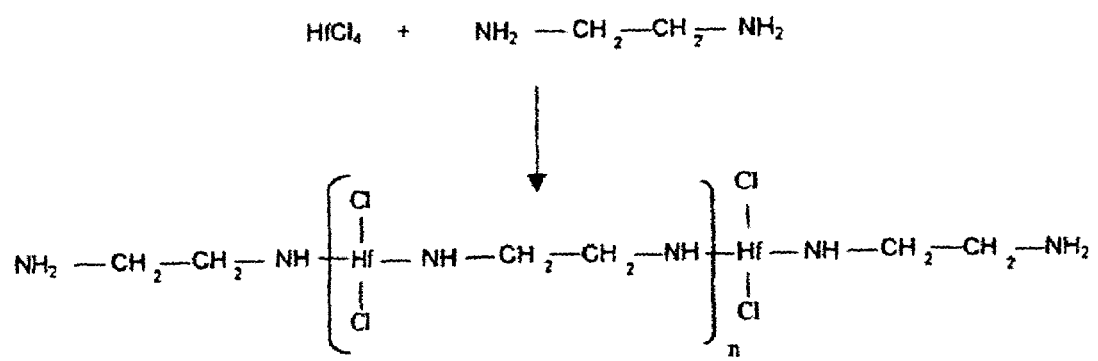
FIG. 6 is a schematic diagram of a reaction scheme of hafnium chloride with ethylene-diamine.

Most potential starting materials of hafnium polymer precursors are expensive. To have a financially competitive synthetic method to make hafnium carbide, nitride or its ceramic compositions requires some high degree of design. The availability of hafnium containing, oxygen free starting materials is principally limited to hafnium halides and their bis(cyclopentadienyl) analogues. The only cost effective starting material is hafnium chloride. There are many theoretically possible bi-functional, commercially available, economically appropriate linkers to form "organic backbone" between hafnium atoms. FIG. 6 is a schematic diagram of a reaction scheme of hafnium chloride with ethylene-diamine.

Figure 7:
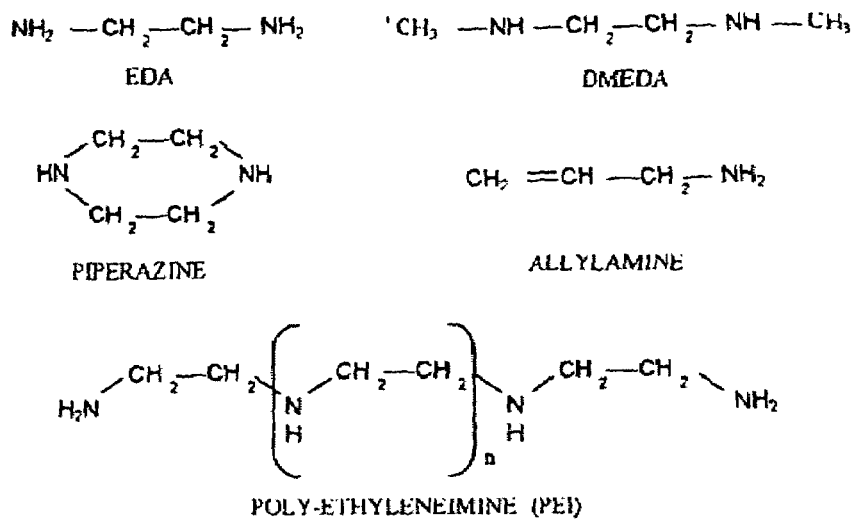
FIG. 7 is a schematic diagram of structures of HfCN pre-ceramic polymer network formers.
Figure 8:
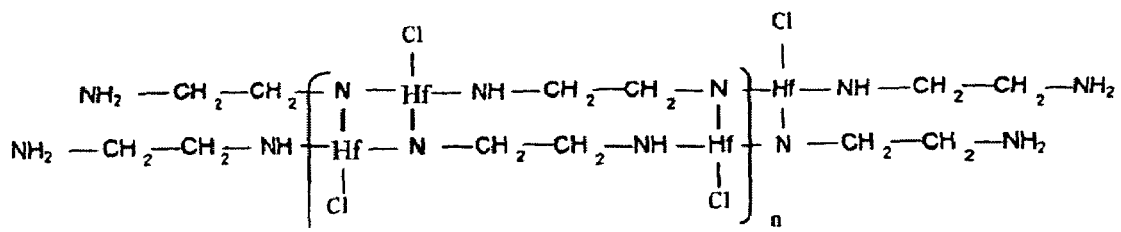
FIG. 8 is a schematic diagram at high temperature of linear HfCN polymers begin to cross-link. Further increased temperature increases thermal decomposition and, as a result, the polymer structure rearranges to form HfCN ceramic.

In preliminary experiments to synthesize preceramic polymers to HfCN, ethylene-diamine(EDA), dimethyl-ethylene-diamirie(DMEDA), piperazine, allylamine, and polyethyleneimines were used to form the polymer backbone by reaction with hafnium tetra-chloride. The structures for these polymer network formers are presented in FIG. 7. When reacting two starting materials, a very exothermic reaction occurred and the liquid mixture solidified. When the exothermic reaction was complete, the temperature was increased to the melting point and slowly increased further to obtain a homogenous, cross-linked polymer. FIG. 8 is a schematic diagram at high temperature of linear HfCN polymers beginning to cross-link. Further increased temperature increases thermal decomposition and, as a result, the polymer structure rearranges to form HfCN ceramic. Polymers were fired at 1200 degrees centigrade to get HfCxNy ceramic. Every step of the reaction was kept in an inert N2 atmosphere (<0.5 ppm oxygen and moisture).

Preliminary experiment results show the desired nitrogen and hafnium content, however, excess free carbon and some oxygen contamination was present. While these preliminary results are encouraging, further optimization of the reaction parameters are necessary. The relatively low ceramic yield is due to a lack of cross-linking and sublimation. In the reaction, chloride is released in the form of hydrochloride which forms salt with amine groups of the amine containing reactant. Organic hydrochloride salts have tendency to sublimate or decompose before or around their melting point.

More study is needed to find optimal conditions of cross-linking, to understand the mechanism, and to avoid salt formation in the polymer.

Figure 9:
FIG. 9 is a photograph of a fiber being extruded from pressurized dye at 120 degrees centigrade.

Preceramic polymers, that are solid at room temperature, can be used to produce fiber by placing them in a pressure tight container with a small orifice at on end and a gas inlet at the other. The chamber can be heated to a determined temperature, usually between 70 to 220 degrees centigrade, depending upon the molecular weight and softening temperature of the polymer. Upon reaching fiber drawing temperature, and after the polymer has thoroughly melted, an inert gas is introduced into the top of the chamber to a given pressure, usually between 2 and 20 pounds per square inch, to force the polymer through the orifice resulting in a fiber as shown in FIG. 9. The fiber can then be wound continuously on a take-up mandrel.

Figure 10:
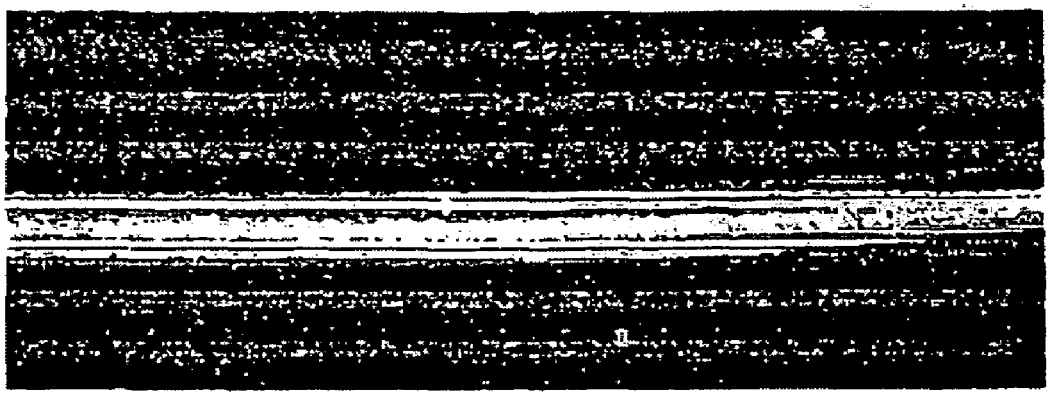
FIG. 10 is a schematic diagram of an optical micrograph of optically transparent preceramic polymer fiber.
Figure 11:
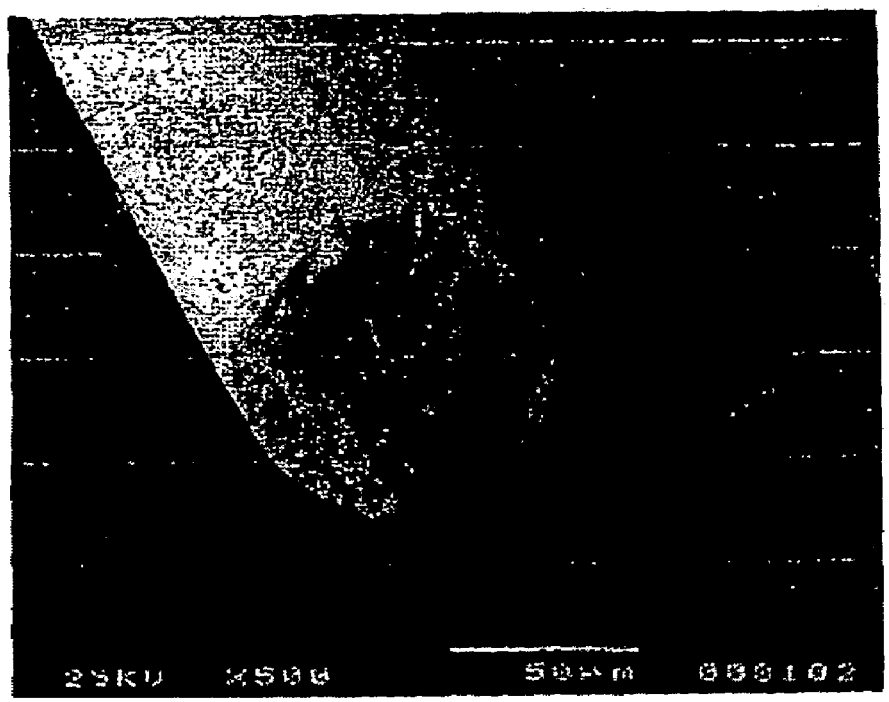
FIG. 11 is a schematic diagram of a scanning electron photomicrograph of a Si3N4/SiC (SiNC) ceramic fiber heat-treated under nitrogen at 1200 degrees centigrade.

The melt-spun fibers are typically transparent or lightly colored, as shown in FIG. 10. The preceramic fibers, which include a photoinitiator, can then be cured by exposure to ultraviolet light. After curing, the fibers can then be pyrolyzed at elevated temperatures (typically between 1100 degrees centigrade and 1600 degrees centigrade, resulting in a dense, uniform structural ceramic fiber, an example of which is shown in FIG. 11.

Figure 12:
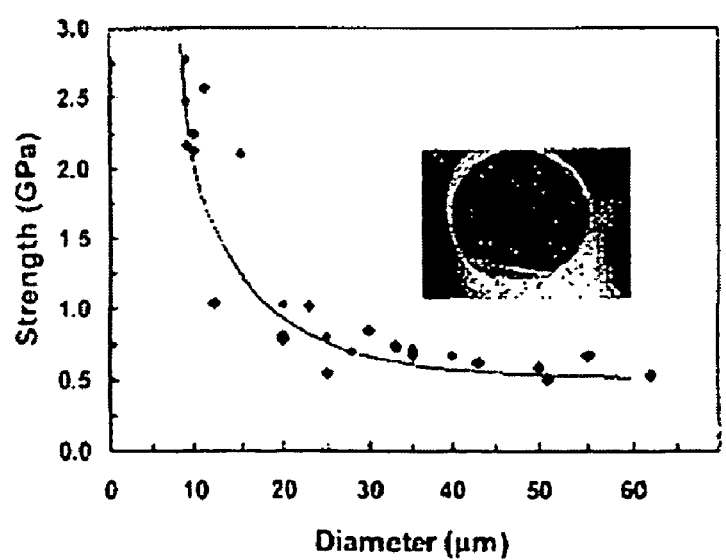
FIG. 12 is a graph of fiber strength as a function of fiber diameter that has been reproduced from Raj, R., Riedel, R., Soraru, G. D., "Introduction to the Special Topical Issue on Ultrahigh-Temperature Polymer-Derived Ceramics", J. Amer. Ceram. Soc., vol. 84[10](2001)pp.2158-59.

Of great importance in making structural ceramic fibers is diameter control. As can be seen in FIG. 12, fiber strength is greatly affected by diameter. For industrial applications, fibers with diameters below 12 microns are preferred.

Figure 13:
FIG. 13 is a schematic diagram of fluorescence emission of preceramic polymer.
Figure 14:
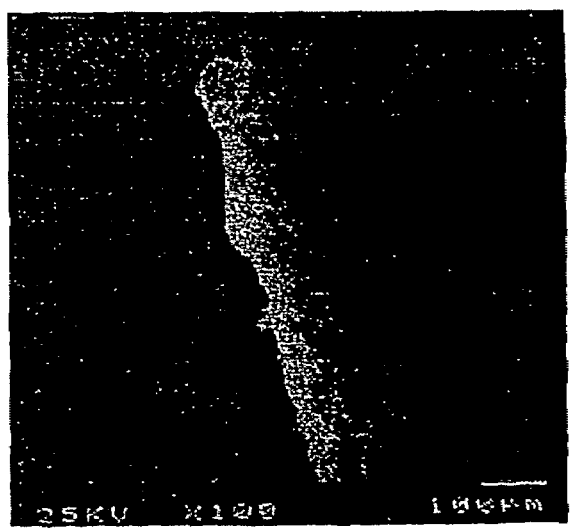
FIG. 14 is a schematic diagram of a scanning electron micrograph of HfC ceramic fiber.
Figure 15:
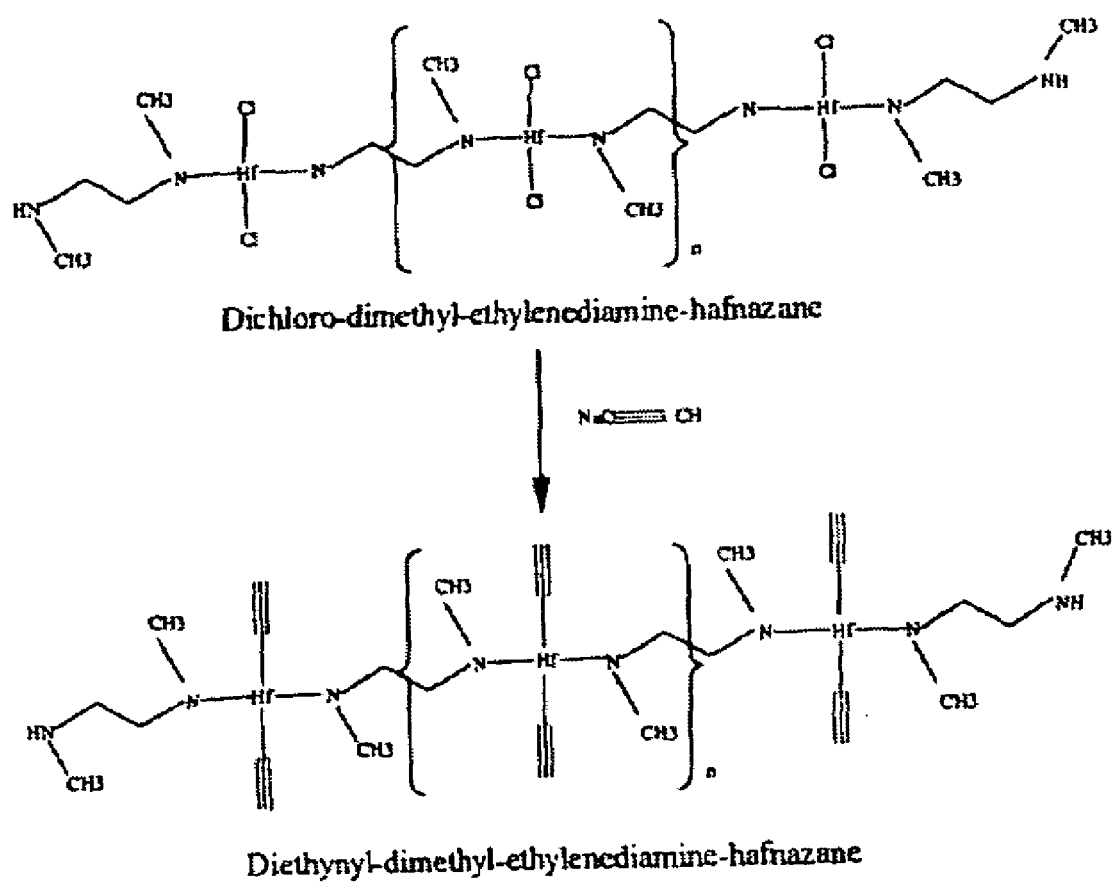
FIG. 15 is a schematic diagram of addition of curable ethynyl side groups onto polymer backbone.

Preceramic polymer fibers prepared from the reaction of hafnium tetrachloride and ethylene-diamine, as described in EXAMPLE 1 below, are shown in FIG. 13. FIG. 14 is a schematic diagram of a scanning electron micrograph of HfC ceramic fiber. FIG. 15 is a schematic diagram of addition of curable ethynyl side groups onto polymer backbone. Unlike other preceramic polymers that have been developed, these fibers, in addition to being photocurable, are also highly fluorescent and phosphorescent. The photo-cured fibers can be heat treated in either inert atmosphere, rendering a black fiber that is principally composed of hafnium carbide (HfC) and a minority phase of hafnium nitride (HfN). When pyrolyzed under a flowing ammonia gas, the resulting fibers are white and composed solely of hafnium nitride (HfN).

A process for fabricating a ceramic matrix composites includes the steps of preparing a solution of thermoplastic photo-curable pre-ceramic polymer, passing a pre-preg through the solution of thermoplastic photo-curable pre-ceramic polymer, applying the pre-preg to a shaped mandrel, using light energy to induce cross-linking of the photo-curable pre-ceramic polymer after application to the mandrel whereby the thermoplastic pre-ceramic polymer is cured and pyrolyzing the cured thermoplastic pre-ceramic polymer matrix composite material.

A single-step fabrication of continuous ceramic fiber ceramic matrix composites employing a thermoplastic photo-curable pre-ceramic polymer in which the component is shape by a variety of standard composite fabrication techniques, such as filament winding, tape winding, and woven cloth winding includes steps of passing ceramic fiber monofilament, tow, mat, or woven cloth through a solution of the thermoplastic photo-curable pre-ceramic polymer, applying ceramic fiber monofilament, tow, mat, or woven cloth to a shaped mandrel, using photo-energy of the ultraviolet, visible or infrared light spectrum to induce cross-linking (curing) of the photo-curable pre-ceramic polymer after application to the mandrel and either partially or completely pyrolyzing the now cured pre-ceramic polymer matrix composite material.

A single-step fabrication of continuous ceramic fiber ceramic matrix composites employing a thermoplastic photo-curable pre-ceramic polymer in which the component is shaped by a variety of standard composite fabrication techniques, such as filament winding, tape winding, and woven cloth winding under inert atmosphere includes steps of passing ceramic fiber monofilament, tow, mat, or woven cloth through a solution of the thermoplastic photo-curable pre-ceramic polymer, applying ceramic fiber monofilament, tow, mat, or woven cloth to a shaped rotating mandrel, use of a heated or unheated compaction roller to press the thermoplastic pre-ceramic polymer onto the mandrel, using ultraviolet, visible, or infrared light to induce cross-linking (curing) of the photo-curable pre-ceramic polymer thereby rendering a thermoset polymer, either partially or completely pyrolyzing the now cured pre-ceramic polymer matrix material and followed by the final heat treatment of the shaped ceramic matrix composite "brown body".

EXAMPLE 1

10 g (31.2 mmol) HfCl4 was put into 15 ml triethylamine, forming a solid-liquid mixture. To this mixture 1.88 g (31.2 mmol) ethylene-diamine was added drop wise over 5 minutes, while the mixture was stirred intensively. When the addition was finished almost all of the liquid triethylamine formed a solid hydrochloride salt. Excess triethylamine removed by distillation and the remaining solid powder heated up. It melted at around 140-160 degrees centigrade. The temperature was increased up to 280 degrees centigrade until it became a clear, transparent, highly fluid polymer melt. After cooling to room temperature, it solidified and was easy to break into small particles, so it appeared like a powder. Solid polymer was melted completely around 120-160 degrees centigrade and slowly cooled down to temperature where the viscosity was high enough to pull fiber. That temperature was around 110-120 degrees centigrade when solid polymer started to melt at the time of heating up. Fiber was pulled from the viscous melt. Fiber kept in a closed glass tube under inert gas (nitrogen) was exposed to UV light for 18 hours.

EXAMPLE 2

The cross-linked fiber of EXAMPLE 1 was placed into an open tube with N2 gas flowing through and heated up to 1100 degrees centigrade with a very low heating speed of around 1 degrees per minute. The resulting fiber after firing was a black HfC containing ceramic fiber that also contains some nitrogen.

EXAMPLE 3

The cross-linked fiber of EXAMPLE 1 was placed into an open tube with NH3 gas flowing through and heated up to 1100 degrees centigrade with a very low heating speed, around 1 degrees per minute. As a result, after firing, a white HfN fiber was observed.

EXAMPLE 4

10 g (31.2 mmol) HfCl4 was put into 15 ml triethylamine, forming a solid-liquid mixture. To this mixture 0.94 g (15.6 mmol) ethylene-diamine and 0.89 g (15.6 mmol) allylamine were added drop wise, simultaneously over 5 minutes, while the mixture was stirred intensively. When the addition was finished almost all of the liquid triethylamine formed a solid hydrochloride salt. Excess triethylamine removed by distillation and the remaining solid powder heated up. It melted at around 80-100 degrees centigrade. The temperature was increased up to 260 degrees centigrade until it became a clear, transparent, highly fluid polymer melt. After cooling to room temperature, it solidified and was easy to break into small particles, so it appeared like a powder. Solid polymer was melted completely around 100-120 degrees centigrade and slowly cooled down to temperature where the viscosity was high enough to pull fiber. That temperature was around 70-80 degrees centigrade when solid polymer started to melt at the time of heating up. Fiber was pulled from the viscous melt. Fiber kept in a closed glass tube under inert gas (nitrogen) was exposed to UV light for 18 hours.

EXAMPLE 5

The cross-linked fiber of EXAMPLE 4 was placed into an open tube with nitrogen gas flowing through and heated up to 1100 degrees centigrade with a very low heating speed of around 1 degree per minute. The resulting fiber after firing was a black HfC containing ceramic fiber that also contains some nitrogen.

EXAMPLE 6

The cross-linked fiber of EXAMPLE 4 was placed into an open tube with NH3 gas flowing through and heated up to 1100 degrees centigrade with a very low heating speed, around 1 degree per minute. As a result, after firing, a white HfN fiber was observed.

EXAMPLE 7

10 g (31.2 mmol) HfCl4 was added slowly into 10 g (113.6 mmol) N,N'-dimethyl-ethylene-diamine liquid at room temperature, while the mixture was stirred intensively. Intensive heat and purple color developed. When the addition was finished temperature increased to 160 degrees centigrade. After cooling to room temperature, it solidified and was easy to break into small particles, so it appeared like a purple powder. Solid was placed into a round shape flask, put on a rotavapor under motor vacuum and the temperature was increased. A small amount of liquid collected (excess of N,N'-dimethyl-ethylene-diamine), however, the solid did not melt even up to 280 degrees centigrade. It was not used for fiber pulling.

EXAMPLE 8

To 5 g (56.8 mmol) N,N'-dimethyl-ethylenediamine 12 g (37.5 mmol) hafnium-chloride was added slowly. Intensive heat and purple color developed. To this liquid 1.92 g (40 mmol) sodium-acetylide was added as suspension in n-hexane. Mixture of 1 ml dimethylformamide (DMF) and 20 ml dichloromethane was added to the reaction mixture. Intensive heat developed again and sodium chloride precipitated out from the solution. After filtration, solvent was removed by rotavapor and the remaining dark brown, viscous oil was heated up to 200 degrees centigrade under motor vacuum. The vacuum and heat-treated oil was cooled down to room temperature. It solidified and was easy to break into small particles, so it appeared like a dark brown powder. The solid polymer was melted completely around 80-110 degrees centigrade and slowly cooled down to temperature where the viscosity was high enough to pull fiber. That temperature was around 90-100 degrees centigrade. Fiber was pulled from the viscous melt. The resulting fiber was photocured under ultraviolet light. After curing, the fiber was heat treated under flowing nitrogen gas to 1100 degrees centigrade.

TABLE 4

Summary of Results of Preliminary HfCN Preceramic Polymer Trials.

| Name | Condition | Polymer g | Melting point °C. | Hf g/polymer g | Ceramic Yield | Hafnium Yield |
| --- | --- | --- | --- | --- | --- | --- |
| PEHN-1 | 1:1/CH2Cl2 | 16.39 | 100–110 | 0.53 | 16.36% | 29.62% |
| PEHN-1/1 | 1:1/CH2Cl3 (two step) | 14.96 | N/A | 0.58 | 20.37% | 33.66% |
| PEHN-2 | 1:1/CH2Br2 | 27 | 100–140 | 0.32 | 18.18% | 54.22% |
| PEHN-3 | 1:1/CHCl3 + TEA | 13.6 | N/A | 0.64 | 16.36% | 24.58% |
| PEHN-4 | 1:1/No solvent | 14 | N/A | 0.62 | 15.38% | 23.79% |
| PEHN-5 | 1:1/Pyridine | 13 | N/A | 0.67 | 26.00% | 37.33% |
| PEHN-6 | 1:1.5 (Hf)/CH2Cl2 | 21.81 | N/A | 0.60 | 19.00% | 30.51% |
| PEHN-7 | 0.5:1 (Hf)/CH2Br2 | 16.1 | N/A | 0.54 | 26.40% | 46.94% |
| PEI | 1:1/CH2Cl2 | 21.8 | N/A | 0.40 | 18.80% | 45.26% |
| EDA | 1:1/pyridine | 37.2 | 150–200 | 0.23 | 16.80% | 69.02% |
| Acetylide | 0.5/1 Hf/acetylide | 17 | N/A | 0.51 | 42.78% | 80.31% |

From the foregoing it can be seen that processes of forming a photocurable pre-ceramic polymer and their applications have been described.

Accordingly it is intended that the foregoing disclosure shall be considered only as an illustration of the principle of the present process. The invention is defined by the appended claims.

What is claimed is:

1. A method for preparing a hafnium-containing material, comprising reacting hafnium-containing halide compound and an amine-containing organic compound to produce a thermoplastic hafnium-containing polymer material; and
forming the thermoplastic hafnium-containing polymer material into a shaped material by heating to at least its softening point and melt-spinning the hafnium-containing polymer material to form a fiber.

2. The method of claim 1, wherein the hafnium-containing halide compound comprises hafnium tetrachloride.

3. The method of claim 2, wherein the amine-containing organic compound comprises ethylene-diamine.

4. The method of claim 2, wherein the amine-containing organic compound comprises dimethyl-ethylene-diamine.

5. The method of claim 2, wherein the amine-containing organic compound comprises piperazine.

6. The method of claim 2, wherein the amine-containing organic compound comprises allylamine.

7. The method of claim 2, wherein the amine-containing organic compound comprises polyethylene-imine.

8. The method of claim 1, wherein the reacting step produces a thermoplastic hafnium-containing polymer material that is phosphorescent.

9. The method of claim 1, further comprising adding a photoinitiator to the thermoplastic hafnium-containing polymer material.

10. The method of claim 1, further comprising cross-linking the shaped material to form a brown body.

11. The method of claim 1, further comprising cross-linking the fiber to form a cross-linked fiber principally composed of the hafnium-containing polymer.

12. The method of claim 11, further comprising pyrolyzing the cross-linked fiber to form a uniform structural fiber principally composed of a hafnium ceramic material.

13. The method of claim 11, further comprising heating the cross-linked fiber in an inert atmosphere to form a uniform structural fiber principally composed of hafnium carbide.

14. The method of claim 11, further comprising heating the cross-linked fiber in a nitrogen-containing atmosphere to form uniform structural fiber principally composed of hafnium nitride.

15. A method for preparing a hafnium-containing material, comprising reacting hafnium-containing halide compound and an amine-containing organic compound, wherein the amine-containing organic compound comprises allylamine.

16. The method of claim 15, wherein the reacting step produces a thermoplastic hafnium-containing polymer material.

17. The method of claim 16, further comprising melt-spinning the thermoplastic hafnium-containing polymer material to form a hafnium-containing polymer fiber.

18. The method of claim 17, further comprising cross-linking the hafnium-containing polymer fiber to form a cross-linked fiber composed of the hafnium-containing polymer.

19. The method of claim 18, further comprising pyrolyzing the cross-linked fiber to form a uniform structural fiber composed of a hafnium ceramic material.

20. A method for preparing a hafnium-containing material, comprising reacting hafnium-containing halide compound and an amine-containing organic compound, wherein the amine-containing organic compound comprises polyethylene-imine.

21. The method of claim 20, wherein the reacting step produces a thermoplastic hafnium-containing polymer material.

22. The method of claim 21, further comprising melt-spinning the thermoplastic hafnium-containing polymer material to form a hafnium-containing polymer fiber.

23. The method of claim 22, further comprising cross-linking the hafnium-containing polymer fiber to form a cross-linked fiber composed of the hafnium-containing polymer.

24. The method of claim 23, further comprising pyrolyzing the cross-linked fiber to form a uniform structural fiber composed of a hafnium ceramic material.

* * * * *